United States Patent [19]

Freeman

[11] 4,006,581
[45] Feb. 8, 1977

[54] FRUIT PICKING DEVICE
[75] Inventor: James W. Freeman, San Pablo, Calif.
[73] Assignee: Sammy Joseph Jackson, San Pablo, Calif. ; a part interest
[22] Filed: July 14, 1975
[21] Appl. No.: 595,789
[52] U.S. Cl. .................................. 56/333; 294/20; 294/99 R
[51] Int. Cl.² ......................................... A01D 46/24
[58] Field of Search ............ 56/332, 333, 334, 339, 56/340, 328 R; 294/99 R, 19 A, 19 R, 20–24

[56] References Cited
UNITED STATES PATENTS

| 467,687 | 1/1892 | Matlock | 56/333 |
| 674,235 | 5/1901 | Dansereau | 56/333 |
| 844,601 | 2/1907 | Koerper | 56/333 |
| 862,227 | 8/1907 | Woodring | 56/333 |
| 1,736,348 | 11/1929 | Kreuzer | 56/333 |
| 2,204,482 | 6/1940 | Filipiak | 294/19 A |
| 2,387,846 | 10/1945 | Hays | 294/20 |
| 2,522,243 | 9/1950 | Wieland | 294/99 R X |
| 2,549,257 | 4/1951 | Staunt | 56/333 X |
| 2,681,822 | 6/1954 | Daniels | 294/20 |
| 2,788,630 | 4/1957 | Nisbet | 56/328 R |
| 3,401,970 | 9/1968 | Russell | 294/19 A |
| 3,743,338 | 7/1973 | Seeger | 294/19 A |

FOREIGN PATENTS OR APPLICATIONS

| 84,493 | 11/1954 | Norway | 56/332 |

Primary Examiner—Russell R. Kinsey
Attorney, Agent, or Firm—Naylor, Neal & Uilkema

[57] ABSTRACT

A receptacle at the end of a pole is provided with loop members which open or spread apart under engagement with the fruit to allow passage thereby of the fruit and which then spring back into enclosing relation with the fruit to enable the fruit to be pulled off the tree.

4 Claims, 6 Drawing Figures

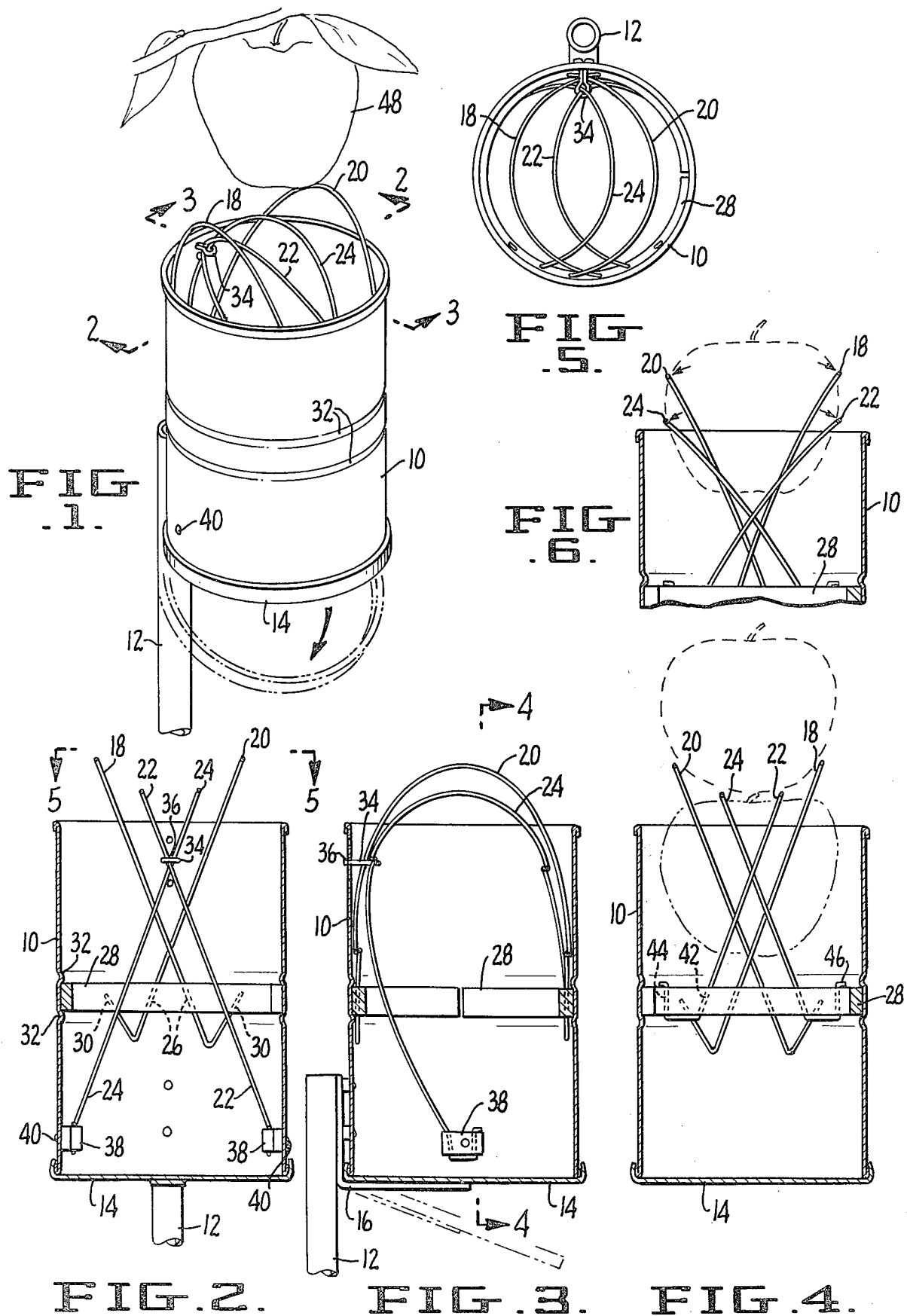

FRUIT PICKING DEVICE

An object of the invention is to provide a fruit picking device having fruit entrapment loops which are operated solely by the fruit being brought into engagement therewith.

Other objects and advantages of the invention will be apparent from the following description taken in conjunction with the drawing forming part of this specification, and in which:

FIG. 1 is a view in perspective of the subject device;
FIG. 2 is a view taken along lines 2—2 of FIG. 1;
FIG. 3 is a view taken along lines 3—3 of FIG. 1;
FIG. 4 is a view taken along lines 4—4 of FIG. 3;
FIG. 5 is a view taken along lines 5—5 of FIG. 2; and
FIG. 6 is a view like FIG. 5 illustrating the way the device operates.

The device comprises a cylindrical container 10 secured to the upper end of a pole 12. The container is provided with a bottom closure member 14 which has a hinge connection with the container provided by flexible angle member 16 which is attached to the container and to the closure member 14.

The container is provided with fruit picking means comprising, preferably, four bowed wire elements 18 and 20 and 22 and 24 forming above the open upper end of the container four arches or half-loops. The wire elements are formed of high carbon wire, commonly known as music wire and sometimes as piano wire. The pair of outer wires 18 and 20 are alike in configuration. They are anchored in place by being passed through passages 26 formed in ring 28 and then having their lower ends bend upwardly and while under tension fitted within other bores 30 formed in the ring.

The ring 28 is preferably a split ring, enabling it to be radially compressed for positioning between upper and lower beads 32 formed in the container. The ring is then released from radial compression to expand and lock itself against the wall of the container between the beads 32.

The wires 22 and 24 constituting the inner and primary pair of fruit picking wires are mounted somewhat differently. At one side of the container they both extend through the eye of a cotter pin 34 which is very loosely fitted within an oversize aperture 36 in the wall of container 10. From there the wires extend down toward the bottom of the container, passing through and back through (see FIG. 3) anchor tabs 38. The tabs 38 are, for example, fixedly attached to rivets 40 which are loosely retained in oversize apertures in the wall of the container 10, thereby mounting the anchor tabs loosely relative to the container to enable them to both pivot and rock or wobble. The other ends of the wires 22 and 24, as shown in FIG. 4, pass through ring member passages 42, then back through ring member passages 44, and terminate in pigtails 46. The mounting system for the primary picking wires 22 and 24 comprising the loose and somewhat floating pivot point defined by the eye of the cotter pin 34 and the loose and somewhat floating anchor connections for the feet of the wire comprised of the anchor tabs 38 are features which extend the life of operation of the device. That is, they tend to relieve stresses and strains in these two wires which might otherwise result in permanent deformation if the wires had stationary points of attachment at the locations of elements 34 and 40.

The operation of the picking device is as follows. With the closure member 14 in the closed position, the device is extended overhead so that a fruit such as the apple 48 bumps against the wires. The weight and the inertia of the fruit to be picked causes the upper ends of the wire pairs to move apart, as indicated by the directional arrows in FIG. 4, to permit the fruit to pass downwardly between the widely spread apart upper ends of the wires 22 and 24. Once the fruit has passed the upper ends of these two wires and has reached a non-blocking position with respect to the wires, the wires snap back into enclosing relation with the upper end of the fruit, as shown in FIG. 4. Thereupon a downward pull of the device breaks the stem connection with the tree and the fruit falls to the bottom of container 10. The container is then pulled down to a handling level for removal of the picked fruit by removal of the closure member 14.

What is claimed is:

1. A fruit picking device comprising a carrier, a pair of piano wire elements having inverted U-shaped forms and residing within intersecting planes, said elements having lower portions connected to the carrier, having upper arcuate portions directed upwardly and away from each other, and having pairs of intermediate cross-over portions below and adjacent said arcuate portions, at least one of said pairs of cross-over portions extending loosely through an oversized eye of a pin attached to said carrier.

2. The device of claim 1, said carrier being a pole-mounted receptacle having a removable closure member enabling the removal therefrom of picked fruit.

3. A fruit picking device comprising a carrier, a pair of flexibly rigid wire-like elements having inverted, U-shaped forms and residing within intersecting planes, said elements having lower ends connected to the carrier, having upper arcuate portions directed upwardly and away from each other, and having pairs of cross-over portions below said arcuate portions, at least one of said pairs being interconnected, said carrier being a pole-mounted receptacle having a removable closure member enabling the removal therefrom of picked fruit, the interconnection between said one pair of cross-over portions comprising the eye of a cotter pin through which said cross-over portions extend, said pin being loosely mounted in the wall of said receptacle so that said hinge connection is freely movable within limits as said arcuate portions yieldingly move away from each other and thereafter spring back toward each other in a fruit-capturing operation.

4. A fruit picking device comprising a carrier, a pair of flexibly rigid wire-like elements having inverted, U-shaped forms and residing within intersecting planes, said elements having lower ends connected to the carrier, having upper arcuate portions directed upwardly and away from each other, and having pairs of cross-over portions below said arcuate portions, at least one of said pairs being interconnected, a second pair of flexibly rigid wire elements having inverted, U-shaped forms and residing within intersecting planes, said elements having their lower ends connected to the carrier and having upper arcuate portions disposed outwardly of and above the arcuate portions of said first-mentioned pair of elements and being operable to guide fruit toward and between said arcuate portions of said first-mentioned pair.

* * * * *